United States Patent [19]

Noguchi

[11] Patent Number: 5,852,461
[45] Date of Patent: Dec. 22, 1998

[54] IMAGE FORMATION SYSTEM AND COLOR MISREGISTRATION CORRECTION SYSTEM

[75] Inventor: Junichi Noguchi, Yokohama, Japan

[73] Assignee: Canon Kabushiki Kaisha, Tokyo, Japan

[21] Appl. No.: 832,860

[22] Filed: Apr. 4, 1997

[30] Foreign Application Priority Data

Apr. 25, 1996 [JP] Japan .................................... 8-105388

[51] Int. Cl.⁶ .................................................. G01D 15/14
[52] U.S. Cl. .......................................................... 347/116
[58] Field of Search .................................... 347/232, 248, 347/249, 250, 116; 358/530, 540, 450

[56] References Cited

U.S. PATENT DOCUMENTS

| | | |
|---|---|---|
| 3,809,806 | 5/1974 | Walker et al. . |
| 4,578,786 | 3/1986 | McIntosh et al. . |
| 4,591,880 | 5/1986 | Mitsuka . |
| 5,055,860 | 10/1991 | Bannai ..................................... 347/249 |
| 5,093,674 | 3/1992 | Storlie ..................................... 347/116 |
| 5,175,564 | 12/1992 | Jamzadeh ................................ 347/116 |
| 5,430,472 | 7/1995 | Curry ...................................... 347/232 |
| 5,457,487 | 10/1995 | Sakaki et al. ........................... 347/116 |
| 5,552,876 | 9/1996 | Muroki et al. ............................. 399/40 |
| 5,680,167 | 10/1997 | Willis ...................................... 347/116 |

*Primary Examiner*—Robert Beatty
*Attorney, Agent, or Firm*—Fitzpatrick, Cella, Harper & Scinto

[57] ABSTRACT

An image processing system which makes deterioration in image quality, which derives from a color mismatch occurring during formation of a color image, indiscernible. The image processing system includes a generator which generates a first line image composed of a plurality of lines which are to be formed on a given medium, and a detector which detects a magnitude of a deviation of a scan position at which the first line image is formed on the given medium from a predetermined scan position at which the first line image is supposed to be formed on the given medium. Also included is a producing unit which produces a second line image composed of a plurality of lines by performing image conversion on the first line image, which substitutes for the first line image according to the magnitude of the deviation, and an image formation unit which forms the second line image on the given medium instead of the first line image.

22 Claims, 8 Drawing Sheets

SEE FIG. 4B

MAIN SCAN DIRECTION

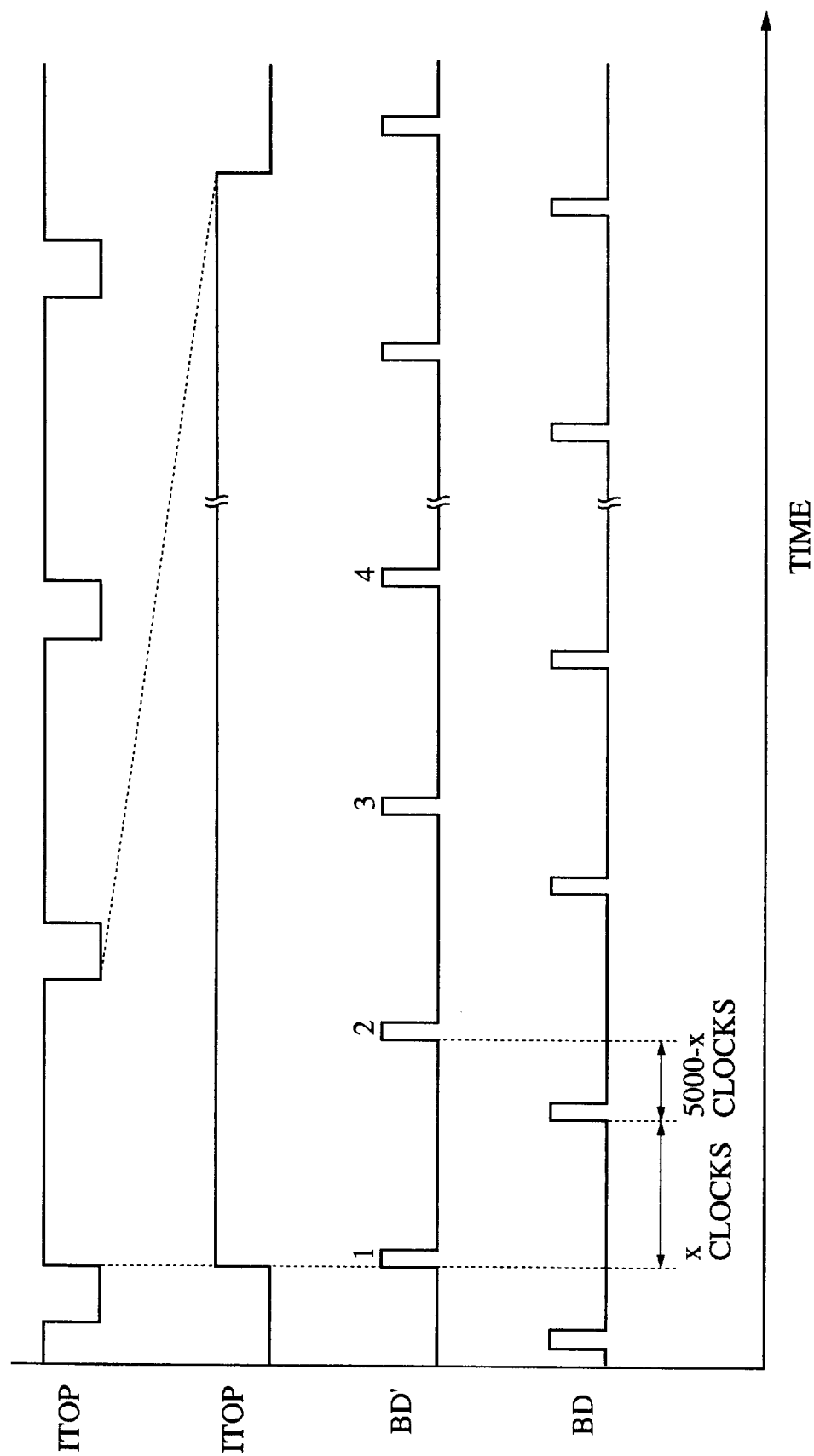

FIG. 8A
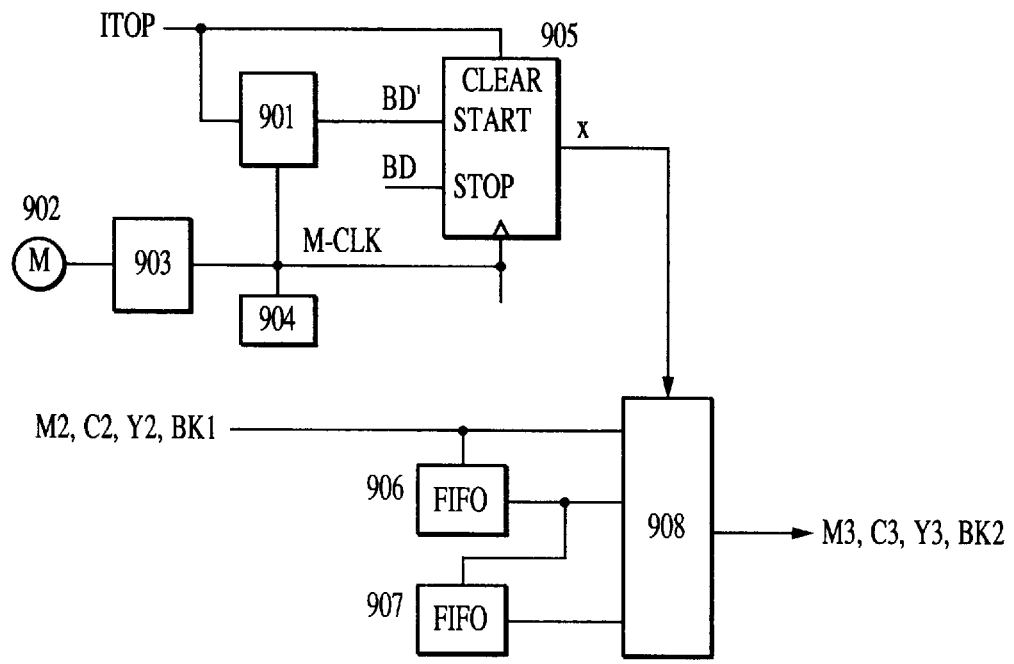
FIG. 8B
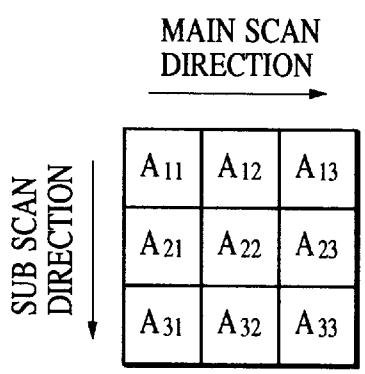
FIG. 8C
FILTER A
| 0 | $\frac{1}{6}$ | 0 |
|---|---|---|
| $\frac{1}{6}$ | $\frac{2}{6}$ | $\frac{1}{6}$ |
| 0 | $\frac{1}{6}$ | 0 |
FIG. 8D
FILTER B
| 0 | 0 | 0 |
|---|---|---|
| 0 | 1 | 0 |
| 0 | 0 | 0 |

IMAGE FORMATION SYSTEM AND COLOR MISREGISTRATION CORRECTION SYSTEM

BACKGROUND OF THE INVENTION

1. Field of the Invention

The present invention relates to an image formation system and method for forming a color image by superposing images of a plurality of color components on one another.

2. Description of the Related Art

A color image formation system is known which outputs a print of color image data, in which a rotary polyhedron is used to scan laser irradiation light over a photosensitive body in the same manner as in a laser beam printer (LBP). Latent images forming lines are thus formed on the photosensitive body, and images of different color components are produced from the latent images using developers of the color components of magenta (M), cyan (C), yellow (Y), and black (BK). The produced images of the color components are superposed on one another on paper immobilized on a transfer drum, and thus a color image is formed.

Another method is such that images of different color components produced on a photosensitive body are superposed on one another on an intermediate transfer body, and the color images produced on the intermediate transfer body are simultaneously transferred to paper.

In such color image formation systems, a photosensitive body and a transfer drum or intermediate transfer body are driven at a constant speed in a direction orthogonal to a main scan direction. Every time the transfer drum or intermediate transfer body makes one turn, one color component is laid on the paper on the transfer drum or on the intermediate transfer body.

Yet another method is such that images of recording color elements are superposed on one another on a photosensitive body and are then simultaneously transferred to a recording paper.

In such a color image formation system, since images of different color components are independently formed, resists applied to positions at which the images of the color components are formed must be matched in order to prevent a color mismatch from occurring in a formed image.

In a method using a transfer drum or intermediate transfer body, a photosensitive body and the transfer drum or intermediate transfer body are driven at substantially the same speed. A latent image of each color component is produced according to the time that an area on the transfer drum or intermediate transfer body in which an image is produced has been rotated or transported to a given position, with respect to a transfer position at which an image is transferred. Thus, resists applied to positions at which images of color components are formed are mutually matched.

In a method for superposing images of different color components on one another on a photosensitive drum, when the top of an image formation area on a photosensitive body arrives at a given position with respect to a position at which an image of each color is formed, an image formation operation is started. Thus, resists applied to the positions at which the images of the color components are formed are mutually matched.

However, in the foregoing known color image formation systems, the control of a main scan for scanning a laser over a photosensitive body and the control for driving the photosensitive body, a transfer drum, an intermediate transfer body, or the like in a sub scan direction are mutually independent. Thus, the precision of a position on the photosensitive body at which the laser is scanned is not guaranteed. As a result, there arises a problem that a color image is formed despite the occurrence of a color mismatch of up to one line in the sub scan direction.

SUMMARY OF THE INVENTION

For solving the above problem, an object of the present invention is to make deterioration in image quality, which derives from a color mismatch occurring when color images are superposed on one another, indiscernible.

For accomplishing the above object, according to a preferred embodiment of the present invention, there is provided an image processing system having a generating means for generating a first line image composed of a plurality of lines which is formed on a given medium, a detecting means for detecting the magnitude of a deviation of a scan position at which the first line image is formed on the given medium from a given scan position at which the first line image is suppose to be formed on the given medium, a producing means for producing a second line image composed of a plurality of lines, which substitutes for the first line image, according to the magnitude of a deviation, and an image forming means for forming the second line image produced by the producing means on the given medium, instead of the first line image.

Other objects and features of the present invention are apparent from the subsequent embodiments and drawings.

BRIEF DESCRIPTION OF THE DRAWINGS

FIG. 7 is a timing chart of image signals in the first embodiment;

FIG. 8A is a block diagram in accordance with the second embodiment.

FIG. 8B is a 3×3 pixel matrix in accordance with the second embodiment; and

FIGS. 8C and 8D are each 3×3 matrix representations of filters A and B, respectively, in accordance with the second embodiment.

DESCRIPTION OF THE PREFERRED EMBODIMENTS (First Embodiment)

The first embodiment of the present invention is described in conjunction with the drawings.

Figure 1:
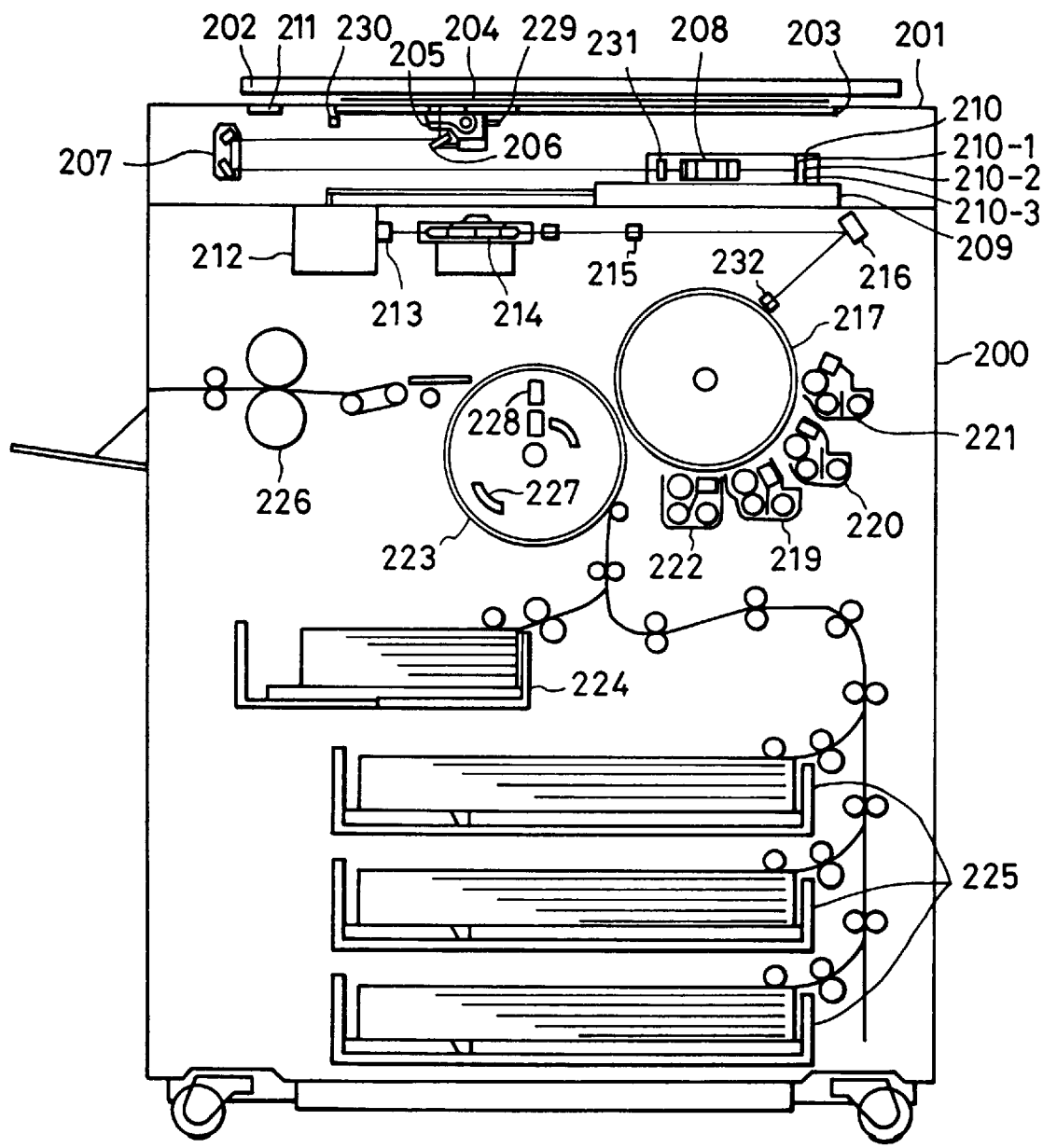
FIG. 1 is a diagram showing the configuration of a color copier.

FIG. 1 shows the overall configuration of a color image formation system in accordance with this embodiment.

In FIG. 1, there is shown an image scanner 201 for reading an original and digitizing signals. Also shown is a printer 200 for outputting a full-color print of an original image read by the image scanner 201 or of an image corresponding to image data sent from an external unit such as an externally connected computer.

In the image scanner 201, there is shown an original platen 202 for placing an original 204 on an original base glass 203. The original 204 on the original base glass 203 is irradiated with light emanating from a halogen lamp 205. Light reflected from the original is reflected by mirrors 206 and 207 and converged on a triple-line sensor (hereinafter CCD) by a lens 208. The lens 208 is provided with a far infrared cut filter 231.

A CCD 210 decomposes light information emanating from the original into respective colors, reads a plurality of color components constituting a full-color image, that is, red (R), green (G), and blue (B) components, and sends the components to a signal processing unit 209. Incidentally, the halogen lamp 205, the mirror 206 and the mirror 207 mechanically move in a vertical direction (hereinafter a sub scan direction) with respect to an electrical scan direction (hereinafter a main scan direction) of the line sensor at a speed V and speed ½ V, respectively. The entire surface of the original is thus scanned.

Figure 2:
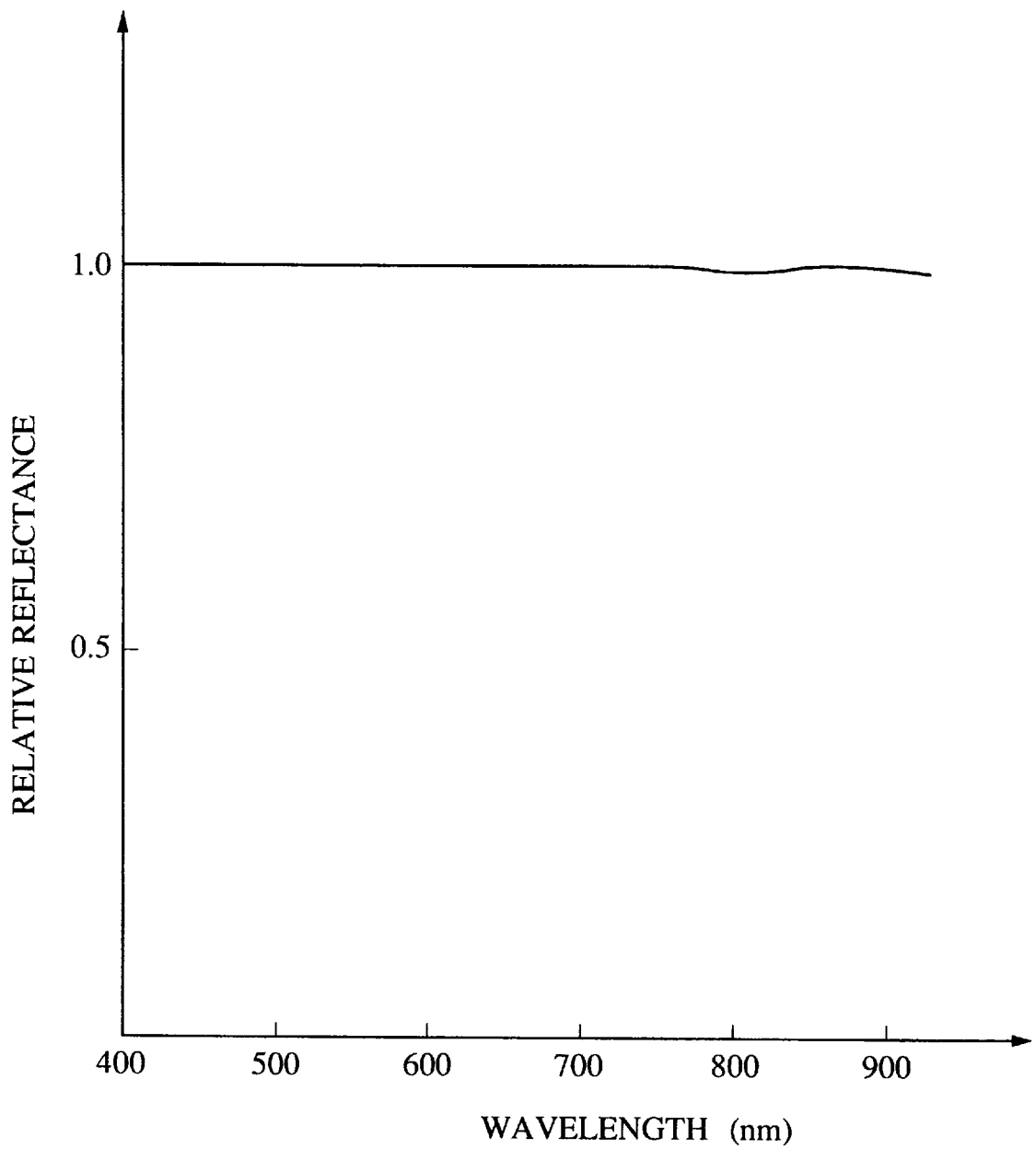
FIG. 2 is a diagram illustrating the light reflection characteristic of a standard white plate.

There is shown a standard white plate 211 that generates correction data items of data items read by red, green, and blue sensors 210-1 to 210-3, respectively. The standard white plate provides a nearly uniform reflection characteristic relative to an infrared spectrum covering the wavelengths of visible light and infrared (see FIG. 2), and is seen as white under visible light. The standard white plate is used to correct output data items of the visible light sensors, that is, the red, green, and blue sensors 210-1 to 210-3, respectively. Also shown is a photosensor 230 for generating an image top signal ITOP in cooperation with a flag plate 229.

The image processing unit 209 electrically processes read red, green and blue signals, converts them into color components of magenta (M), cyan (C), yellow (Y), and black (BK), respectively, and sends the color components to the printer 200. With every scan of an original performed by the image scanner 201, one of color components of magenta, cyan, yellow, and black is sent to the printer 200. After a total of four original scans, one printout of a color image is completed.

In the printer 200, an image signal sent from the image scanner 201 or an external unit, such as a computer, is sent to a laser driver 212. The laser driver 212 modulates and drives a semiconductor laser 213 according to each of image signals of magenta, cyan, yellow, and black.

Laser light is reflected by a rotating polygon mirror 214, Fθ-corrected by an F-θ lens 215, and scanned over a photosensitive drum 217 via a mirror 216. Thus, an electrostatic latent image is formed on the photosensitive drum 217. A BD sensor 232 is located near a scan start position at which scanning laser light along one line is started, and detects scanning of laser light along the line, and generates a BD signal.

There are shown developing units 219 to 222; a magenta developing unit 219, a cyan developing unit 220, a yellow developing unit 221, and a black developing unit 222. The four developing units alternately come into contact with the photosensitive drum 217 and develop the latent images of magenta, cyan, yellow and black formed on the photosensitive drum 217 using corresponding color toners. Also shown is a transfer drum 223 around which paper fed from any one of paper cassettes 224 and 225 is wound. Thus, toner images developed on the photosensitive drum 217 are transferred to the paper.

A sensor 228 for generating an ITOP signal indicating the top of paper on the transfer drum is incorporated in the transfer drum 223. When the transfer drum rotates and a flag 227 fixed to the transfer drum passes through the sensor 228, an ITOP signal is produced. After four colors of magenta, cyan, yellow, and black are thus successively transferred, the paper is ejected via a fusion unit 226.

Next, the flow of image signals is described.

Figure 3:
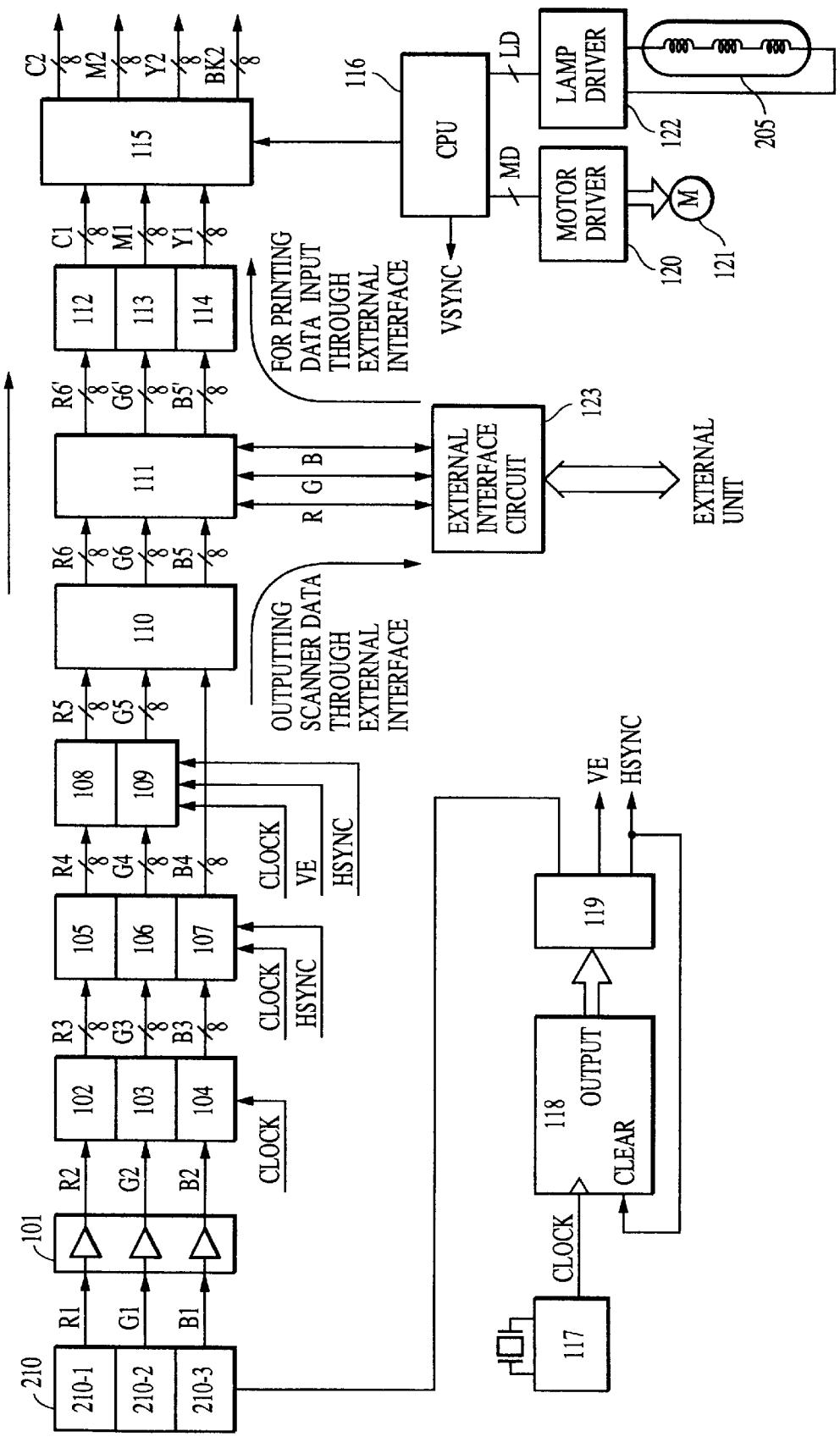
FIG. 3 is a block diagram of an image signal control unit.

FIG. 3 is a block diagram of an image signal control unit showing the flow of image signals from the image scanner 210.

Image signals R1, G1, and B1 output from the CCD 210 are input to an analog signal processing unit 101, and subjected to gain control and offset adjustment. Thereafter, the resultant image signals R2, G2, and B2 are converted into 8-bit digital image signals in that order by A/D converters 102 to 104. The resultant 8-bit signals R3, G3, and B3 are then input to shading correction units 105 to 107, and subjected to known shading correction in that order using signals read by the standard white plate 211 (FIG. 1).

There is shown a clock generator 117 for generating a clock in units of one pixel. A main scan address counter 118 is an up counter that counts the number of clocks and produces an output of a pixel address along one line. Also shown is a decoder 119 for decoding a main scan address provided by the main scan address counter 118, and produces line by line a CCD driving signal such as a shift pulse or reset pulse, a VE signal indicating an effective area which is contained in a signal read from the one line by the CCD, and a line synchronizing (hereinafter sync) signal HSYNC. The main scan address counter 118 has a count thereof cleared by the HSYNC signal, and starts counting so as to provide a main scan address on a subsequent line.

Figure 4A:
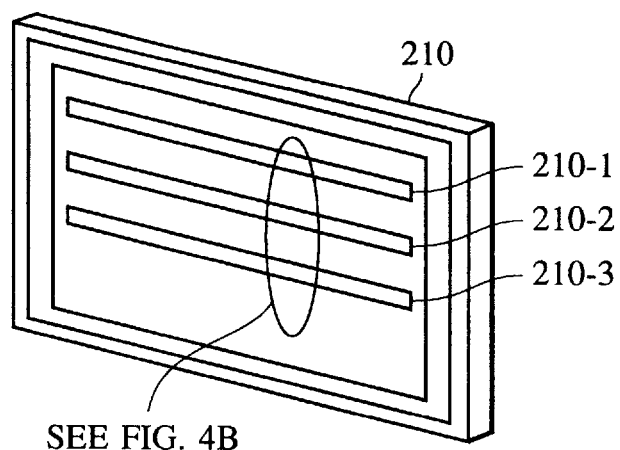
FIGS. 4A and 4B are diagrams showing the structure of a triple-line color sensor.
Figure 4B:
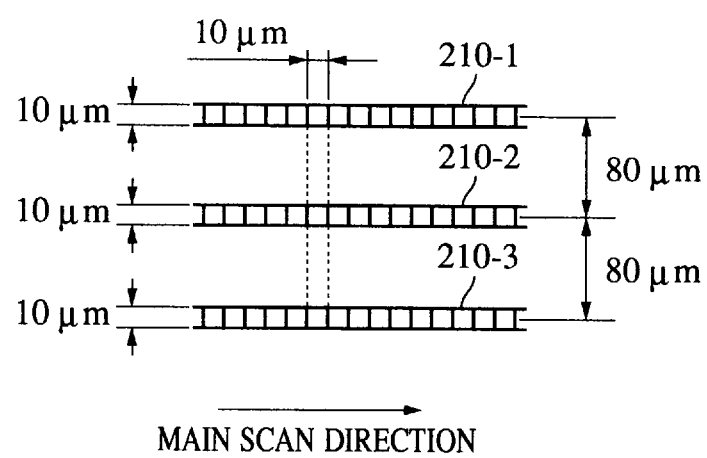

FIGS. 4A and 4B are diagrams showing the structure of the triple-line color sensor. As illustrated, light-receiving sections 210-1, 210-2, and 210-3 of the CCD 210 are arranged with a predetermined distance between each pair of sensors. The red, green, and blue sensors therefore read different lines on an original placed on the original base. Line delay devices 108 and 109 each correct a spatial mismatch in the sub scan direction. More particularly, since image signals R4 and G4 represent original information read in the sub scan direction earlier than that represented by the image signal B4, the image signals R4 and G4 are delayed by times comparable to 16 lines and 8 lines, respectively, in the sub scan direction, and thus are matched with the image signal B4.

Returning to FIG. 3, there is shown an input masking circuit 110 that masks the image signals R5, G5, and B4 of which spatial mismatch has been corrected using a matrix computation. A selector 111 changes directions in which image signals flow according to whether "normal copying," "outputting scanner data through an external interface," or "printing image data input through the external interface" is in progress. Herein, when "outputting scanner data through the external interface" is in progress, image data items R6, G6, and B5 received from the input masking circuit 110 are output to the outside through an external interface circuit 123 a controlled by the selector 111.

When "normal copying" is in progress, image data items R6, G6, and B5 received from the input masking ciucuit 110 are output to light value-to-density converters 112 to 114 as controlled by the selector 111.

There are shown light value-to-density converters 112 to 114 that are formed by look-up table ROMs which convert luminance signals contained in the image data items R6', G6', and B5' into density signals C1, M1, and Y1. There is also shown a masking/UCR circuit 115, of which a detailed description is omitted, as such circuit is well known in the art. Briefly, the masking/UCR circuit 115 extracts a black signal (BK) from the three input primary color signals C1, M1, and Y1, carries out computation for correcting the color turbidity of recording color materials occurring in the printer 212, and successively outputs color signals Y2, M2, C2, and BK1 of a given bit length of, for example, 8 bits every time a reading operation is carried out. When "printing image data input through the external interface" is in progress, image data (R, G, B) sent from an external unit is input to the light value-to-density converters 112 to 114 as controlled by the selector 111, and then subjected to the above processing by masking/UCR circuit 115.

There is shown a CPU 116 responsible for sequence control such as control of a motor driver 120 for driving a motor 121 for an original reading optical system and control of a lamp driver 122 for turning ON or OFF an original illumination lamp 205, and control for generating a pixel interval signal VSYNC indicating a pixel interval in the sub scan direction.

Figure 5:
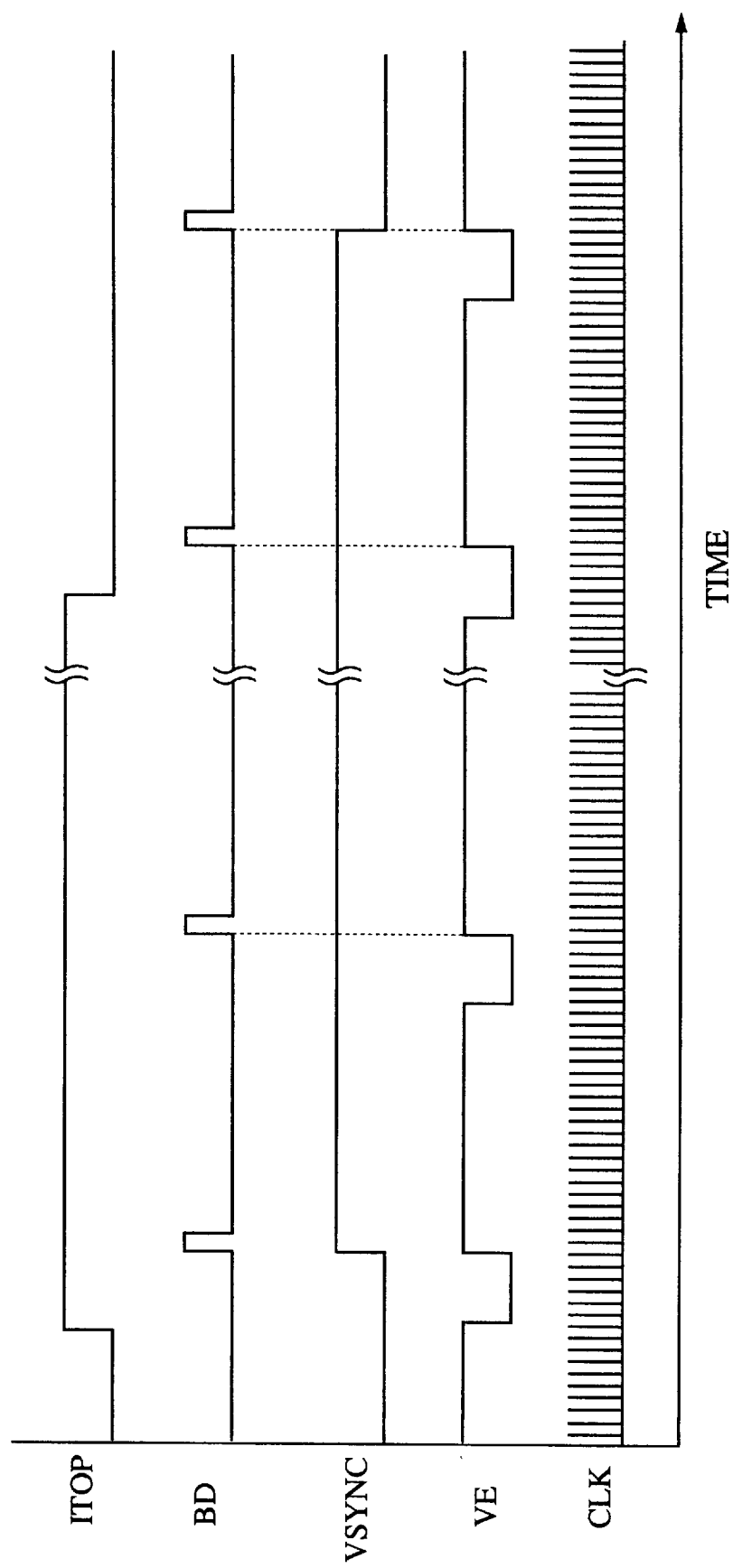
FIG. 5 is a timing chart of image signals.

FIG. 5 is a diagram showing timing of control signals employed in this embodiment.

A VSYNC signal is an image effective interval signal indicating an image effective interval in the sub scan direction. Image reading (scan) is carried out during an interval during which the VSYNC signal represents a logical 1, and output signals (C, M, Y, and BK) are successively produced.

The VSYNC signal is generated synchronously with a first BD pulse generated after the ITOP signal. The ITOP signal is a signal indicating that the top of the paper is on the transfer drum 213, and is set to logical 1, and remains a logical 1 until a given number N of BD pulses are counted to determine which kind of copying paper is being used.

The ITOP signal and BD signal are produced by systems that operate in mutual independence. The time required after the ITOP signal is generated until the BD pulse indicating a position at which the laser starts writing varies for each color plane, depending on which of M, C, Y, and BK color components is printed. Consequently, a recording position varies for each color plane depending on which of the M, C, Y, and BK color components is being processed.

A VE signal is an image effective interval signal indicating an image effective interval in the main scan direction. Timing of a main scan start position is indicated by the VE signal being a logical 1. The VE signal is employed to control counting of the number of lines, and for delaying a signal by a time comparable to the number of lines counted.

A CLOCK signal is a pixel sync signal. Image data is transferred according to the time at which that the CLOCK signal rises from a voltage representing logical 0 to a voltage representing logical 1.

Figure 6A:
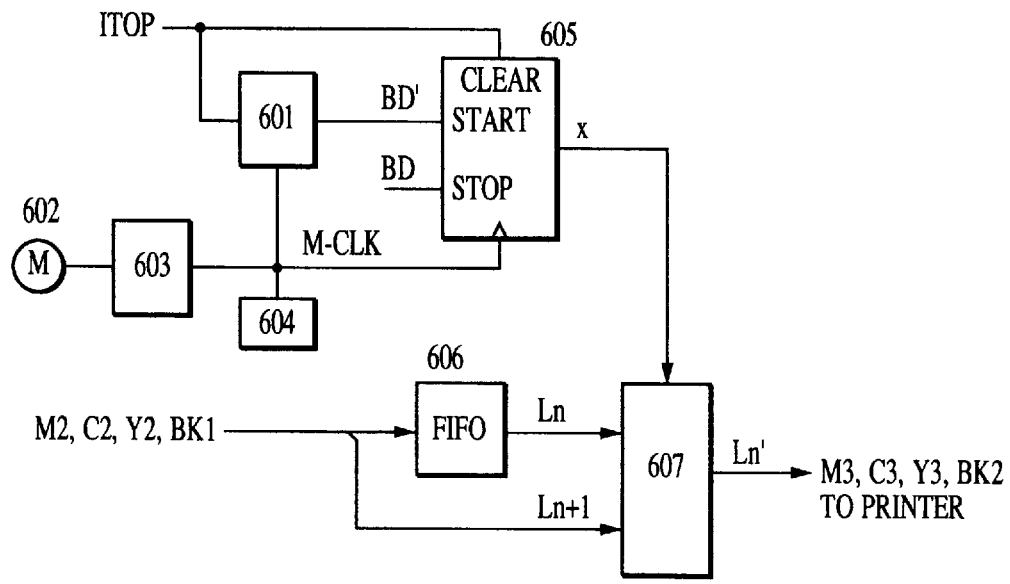
FIGS. 6A and 6B are block diagrams in accordance with the first embodiment.

Next, the first embodiment of the present invention is described in conjunction with FIGS. 6A and 7.

In FIG. 6A, there is shown a clock generator 604 for providing a clock (M-CLK) to a polygon motor control circuit 603 that controls a motor 602 for driving the polygon mirror 214 (FIG. 1) so that the polygon mirror 214 rotates. Also shown is a sync signal generating circuit 601 that uses a M-CLK clock produced by a CLK generator 604 and the ITOP signal to produce a BD' signal having the same cycle as the BD signal as shown in FIG. 7, and which is synchronous with the leading edge of the ITOP signal.

A counter 605 counts the number of M-CLK clocks for a period of time starting with the leading edge of the BD' signal and ending with the leading edge of the next BD signal, and thus obtains the magnitude of a deviation of each color recording position from an ideal color recording position. Alternatively, the number of M-CLK clocks may be counted for a period of time starting with the leading edge of the ITOP signal and ending with the leading edge of the BD signal. The count value X indicates the magnitude of a deviation of a recording position from an ideal recording position.

The count of the counter 605 is cleared during an interval during which the ITOP signal represents logical 0. Assuming that the number of pixels in the main scan direction is 5000, the number X of M-CLK clocks counted by the counter 605 is 0≦X<5000.

Assume that lines at ideal recording positions along which a main scan is carried out are lines L1, L2, etc., and Ln, lines at actual recording positions each deviated by a distance comparable to X clocks in the sub scan direction are lines L1', L2', etc., and Ln'. Each of image data items Y2, M2, C2, and BK1 constituting line L2, which is output from the output masking/UCR circuit 115, and each of image data items constituting line L1, which are delayed by the time comparable to one line by a FIFO 606, are computed according to expression (1) below, using the magnitude of a deviation X by means of an arithmetic unit 607. Thus, image data items Y3, M3, C3, and BK2 constituting line L1' interposed between lines L1 and L2 are produced and sent to the printer. This means that if the recording position of line L1' is closer to the recording position of line L1, more color components of image data corresponding to line L1 are contained in image data corresponding to line L1', and that if the recording position of line L1' is closer to the recording position of line L2, more color components of image data corresponding to line L2 are contained in the image data corresponding to line L1'.

$$Ln' = \frac{(5000 - X) \times Ln + X \times Ln + 1}{5000} \qquad (1)$$

In the above example, the number of M-CLK clocks is counted for a period of time starting with the leading edge of the BD' signal and ending with the leading edge of the next BD signal. Alternatively, the number of clocks CLK may be counted for a period of time starting with the first BD pulse following the ITOP signal and ending with the second BD' pulse.

Figure 6B:
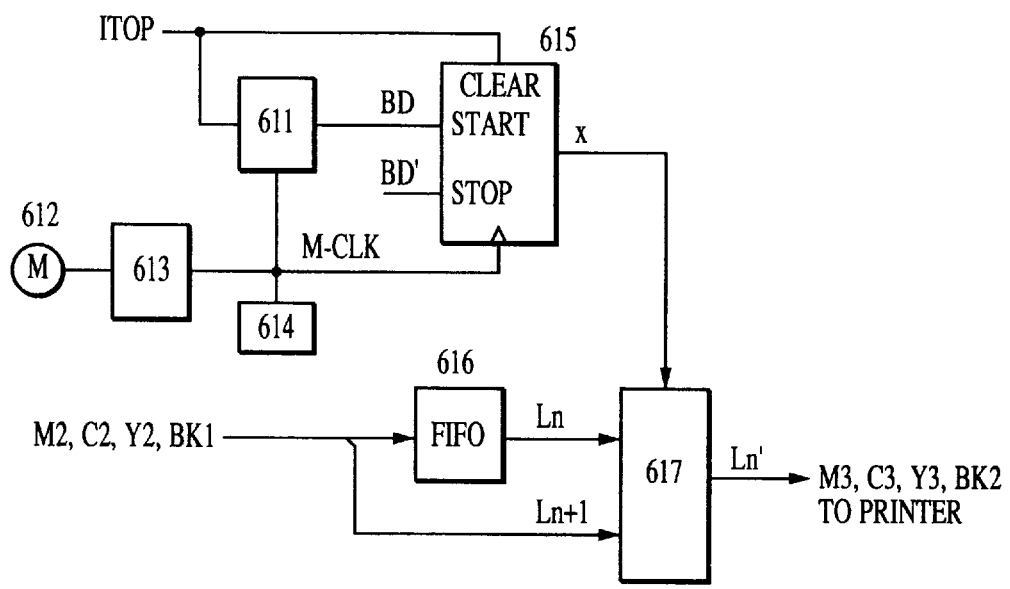

In FIG. 6B, there is shown a clock generator 614 that sends a clock (M-CLK) to a polygon motor control circuit 613 that controls a motor 612 for driving the polygon mirror 214 (FIG. 1) so that the polygon mirror 214 rotates.

There is shown a sync signal generating circuit 611 that produces a BD' signal having the same cycle as the BD signal as shown in FIG. 7, and which is synchronous with the leading edge of the ITOP signal. The number of clocks M-CLK is counted by a counter 615 for a period of time starting with a first BD pulse that is generated following the ITOP signal, and ending with the second BD' pulse. Assuming that the number of pixels in the main scan direction is 5000, an actual recording position is deviated from an ideal recording position in the sub scan direction by a distance comparable to a difference calculated by subtracting the number of counted clocks X from 5000. The count value of the counter 615 is cleared during an interval during which the ITOP signal represents logical 0.

Assume that lines at actual recording positions deviated by a distance comparable to X clocks in the sub scan direction from lines L1, L2, etc., and Ln at ideal recording positions are L1', L2', etc., and Ln'. Each of image data items Y1, M2, C2, and BK1 constituting line L2, which are sent from the masking/UCR circuit 115 (FIG. 3), and each of image data items constituting line L1, which are delayed by the time comparable to one line by a FIFO 616, are computed according to expression (2) below, using the magnitude of a deviation X by means of an arithmetic unit 617. Consequently, image data items Y3, M3, C3, and BK2 constituting line L1' interposed between lines L1 and L2 are produced and output to the printer. This means that if the recording position of line L1' is closer to the recording position of line L1, more components of image data corresponding to line L1 are contained in image data corresponding to line L1', and that if the recording position of line L1' is closer to the recording position of line L2, more components of image data corresponding to line L2 are contained in image data corresponding to line L1'.

$$Ln' = \frac{X \times Ln + (5000 - X) \times Ln + 1}{5000} \quad (2)$$

Even if lines at actual recording positions are deviated by a distance comparable to X clocks from lines L1, L2, etc., and Ln at ideal recording positions, image data items corresponding to lines L1', L2', etc., and Ln' deviated by the distance comparable to X clocks are produced through the above computation. Consequently, the influence of a color mismatch is minimized.

According to this embodiment, actual image data is used to perform interpolation according to the magnitude of a color mismatch. Deterioration in image quality due to the color mismatch is made indiscernible.

(Second Embodiment)

Next, the second embodiment of the present invention is described in conjunction with FIG. 8A.

First, a phase difference between the ITOP and BD signals is detected in the same manner as that in the first embodiment. In FIG. 8A, there is shown a clock generator 904 that outputs a clock (M-CLK) to a polygon motor control circuit 903 that controls a motor 902 for driving the polygon mirror 214 (FIG. 1) so that the polygon mirror 214 rotates. Also shown is a sync signal generating circuit 901 that produces a BD' signal having the same cycle as the BD signal shown in FIG. 7, and which is synchronous with the leading edge of the ITOP signal. A counter 905 counts the number of M-CLK clocks for a period of time starting with the leading edge of the BD' signal and ending with the leading edge of the next BD signal, and thus obtains the magnitude of a deviation of each color recording position from an ideal recording position.

When "printing image data input through an external interface" is in progress, if the magnitude of a deviation X detected in an image signal exceeds a certain threshold value (for example, the number of counted clocks CLK is 2500 or more, that is, the magnitude of a deviation is ½ line or more), each of image data items Y2, M2, C2, and BK1 output from the masking/UCR circuit 115 (FIG. 3) is filtered by filter A shown in FIG. 8C. In other words, values of 3×3 pixels adjoining an object pixel A22 shown in FIG. 8B are multiplied by coefficients provided by the filter A. The filter A is designed to smooth a significant change in density. That is to say, the density of an area suffering from a significant difference in density is smoothed by computing the following expression:

$A22' = 0/6 \times A11 + 1/6 \times A12 + 0/6 \times A13 +$ $1/6 \times A21 + 2/6 \times A22 + 1/6 \times A23 + 0/6 \times A31 + 1/6 \times A32 + 0/6 \times A33$ This results in an image in which a color mismatch is unobtrusive.

If a phase difference is smaller than the threshold value (for example, the number of counted CLK clocks is smaller than 2500, that is, the magnitude of a deviation is less than ½ line), or if "normal copying" is in progress, filter B shown in FIG. 8D is applied to each of the image data items Y2, M2, C2, and BK1. The filter B is designed to work in the same way as if no filtering is performed on image data. In this case, filtering need not be carried out.

In this embodiment, filtering is carried out according to the magnitude of a color mismatch. Consequently, deterioration in image quality due to a color mismatch is made indiscernible. When the first and second embodiments are used in combination, deterioration in image quality due to a color mismatch is made indiscernible. To be more specific, filtering is carried out according to the magnitude of a deviation after the completion of interpolation.

(Other Embodiments)

In the aforesaid embodiments, a system for transferring toner images formed on the photosensitive drum 217 directly to paper on the transfer drum 223 has been described. Processing similar to the aforesaid one can be employed in an image formation system using an intermediate transfer body like the one described in the prior art.

A color mismatch in an image among color components of yellow, magenta, cyan, and black used to form a color image on the photosensitive drum 217 has been described. The present invention is not limited to this kind of color mismatch, but may be adapted to a color mismatch occurring on an intermediate transfer body or transfer drum but not on the photosensitive drum. Furthermore, the present invention can be adapted to a color mismatch occurring on transfer paper.

In the aforesaid embodiments, interpolation or filtering is carried out according to the magnitude of a deviation of each color recording position from an ideal recording position. Depending on the magnitude of a deviation, control may be provided so that the aforesaid processing is not carried out.

The method of interpolation is not limited to the methods using expressions (1) and (2). Alternatively, two upper lines and two lower lines (a total of four lines) may be computed to determine each line Ln', or a complex computation may be carried out to obtain line Ln'.

The size of the filter used for filtering is not limited to 3×3 but may be, for example, 5×5. Thus, finer filtering is achieved.

The present invention is not limited to an image formation system in which one photosensitive drum is shared by four colors of yellow, magenta, cyan and black, but may apply to an image formation system in which photosensitive drums are juxtaposed by the number of color components necessary for forming an image (for example, photosensitive drums dedicated to colors of yellow, magenta, cyan, and black are juxtaposed). The aforesaid method of the embodiment may then be adapted to a color mismatch among toner images transferred from the photosensitive drums dedicated to the colors.

As described so far, according to the present invention, interpolation or filtering is carried out according to the magnitude of a color mismatch occurring in image formation. Consequently, deterioration in image quality due to a color mismatch occurring when colors are superposed on one another in order to form a color image are made indiscernible.

A variety of variants of the present invention can be formed within the scope of the present invention defined by the subsequent claims.

What is claimed is:

1. An image formation system, comprising:

a generating means for generating a first line image composed of a plurality of lines which are to be formed on a given medium;

a detecting means for detecting a magnitude of a deviation of a scan position at which the first line image will be formed on the given medium from a given scan position at which the first line image is supposed to be formed on the given medium;

a producing means for producing a second line image composed of a plurality of lines, as a substitute for the first line image, according to the magnitude of a deviation, wherein at least one of the lines constituting the second line image is produced by said producing means on the basis of a plurality of the lines constituting the first line image; and an image forming means for forming the second line image produced by said producing means on the given medium instead of the first line image.

2. An image formation system according to claim 1, wherein the given medium is a photosensitive body.

3. An image formation system according to claim 1, wherein the given medium is a transfer body.

4. An image formation system according to claim 1, wherein the given medium is an intermediate transfer body.

5. An image formation system according to claim 1, wherein the given medium is transfer paper.

6. An image formation system according to claim 1, wherein detection of the magnitude of a deviation by said detecting means is carried out on the basis of a first signal indicating a position of a scanning line at which said image forming means intends to form the first line image on the given medium, and a second signal indicating the position of a scanning line at which said image forming means is suppose to form the first line image on the given medium.

7. An image formation system according to claim 6, wherein the first signal is a signal synchronous with a signal indicating a top of an image to be formed on the given medium.

8. An image formation system according to claim 1, wherein said generating means generates the first line image for each of a plurality of colors constituting a color image, and said detecting means detects the magnitude of a deviation for each of the plurality of colors, said producing means produces an image for each of the plurality of colors, and said image forming means forms an image for each of the plurality of colors.

9. An image formation system according to claim 1, further comprising a scanner for reading an original image and supplying the read image to said generating means.

10. An image formation system comprising:

a generating means for generating a first line image composed of a plurality of lines which are to be formed on a given medium;

a detecting means for detecting a magnitude of a deviation of a scan position at which the first line image will be formed on the given medium from a given scan position at which the first line image is supposed to be formed on the given medium;

a producing means for producing a second line image composed of a plurality of lines, as a substitute for the first line image, according to the magnitude of a deviation;

an image forming means for forming the second line image produced by said producing means on the given medium instead of the first line image; and a filtering means for carrying out filtering according to the magnitude of a deviation.

11. An image formation system according to claim 10, wherein said filtering is smoothing.

12. An image formation method comprising:

a generation step of generating a first line image composed of a plurality of lines which are to be formed on a given medium;

a detection step of detecting a magnitude of a deviation of a scan position at which the first line image will be formed on the given medium from a given scan position at which the first line image is supposed to be formed on the given medium;

a production step of producing a second line image composed of a plurality of lines, as a substitute for the first line image, according to the magnitude of a deviation, wherein at least one of the lines constituting the second line image is produced by said production step on the basis of a plurality of the lines constituting the first line image; and an image formation step of forming the second line image produced by said producing means on the given medium instead of the first line image.

13. An image formation system, comprising:

a generating means for generating a first line image composed of a plurality of lines which are to be formed on a given medium;

a detecting means for detecting a magnitude of a deviation of a scan position at which the first line image will be formed on the given medium from a given scan position at which the first line image is supposed to be formed on the given medium;

a producing means for producing a second line image composed of a plurality of lines by performing image conversion on the first line image according to the magnitude of a deviation; and an image forming means for forming the second line image produced by said producing means on the given medium instead of the first line image.

14. An image formation system according to claim 13, wherein the given medium is a photosensitive body.

15. An image formation system according to claim 13, wherein the given medium is a transfer body.

16. An image formation system according to claim 15, wherein the given medium is an intermediate body.

17. An image formation system according to claim 13, wherein the given medium is transfer paper.

18. An image formation system according to claim 13, wherein the image conversion is performed by filtering.

19. An image formation system according to claim 13, wherein the image conversion is performed by smoothing.

20. An image formation system according to claim 13, wherein said generating means generates the first line image for each of a plurality of colors constituting a color image, said detecting means detects the magnitude of a deviation for each of the plurality of colors, said producing means produces an image for each of the plurality of colors, and said image forming means forms an image for each of the plurality of colors.

21. An image formation system according to claim 13, further comprising a scanner for reading an original image and supplying the read image to said generating means.

22. An image formation method comprising:

a generation step of generating a first line image composed of a plurality of lines which are to be formed on a given medium;

a detection step of detecting a magnitude of a deviation of a scan position at which the first line image will be formed on the given medium from a given scan position at which the first line image is supposed to be formed on the given medium;

a production step of producing a second line image composed of a plurality of lines by performing image conversion on the first line image according to the magnitude of a deviation; and an image formation step of forming the second line image produced by said producing means on the given medium instead of the first line image.

* * * * *

UNITED STATES PATENT AND TRADEMARK OFFICE
CERTIFICATE OF CORRECTION

PATENT NO. : 5,852,461

DATED : December 11, 1998

INVENTOR(S) : JUNICHI NOGUCHI

It is certified that error appears in the above-identified patent and that said Letters Patent is hereby corrected as shown below:

COLUMN 10 line 44,   "claim 15," should read --claim 13,--.

COLUMN 12 line 4,   "producing means" should read --production step--.

Signed and Sealed this

Eighth Day of February, 2000

Attest:

Attesting Officer

Q. TODD DICKINSON

Commissioner of Patents and Trademarks